United States Patent [19]

Sinclair

[11] Patent Number: 5,095,272
[45] Date of Patent: Mar. 10, 1992

[54] METHODS FOR DETERMINING FORMATION DIP AND STRIKE USING HIGH FREQUENCY PHASE SHIFT

[75] Inventor: Paul Sinclair, Clearlake Shores, Tex.

[73] Assignee: Halliburton Logging Services, Inc., Houston, Tex.

[21] Appl. No.: 498,122

[22] Filed: Mar. 23, 1990

[51] Int. Cl.$^5$ .............................................. G01V 3/30
[52] U.S. Cl. ..................................................... 324/339
[58] Field of Search ................................. 324/338, 339

[56] References Cited

U.S. PATENT DOCUMENTS

| | | |
|---|---|---|
| 3,551,797 | 12/1970 | Gouilloud et al. |
| 4,401,947 | 8/1983 | Cox |
| 4,422,043 | 12/1983 | Meador ............................. 324/338 |
| 4,600,887 | 7/1986 | Baldwin et al. |
| 4,739,272 | 4/1988 | Griffin et al. |
| 4,780,678 | 10/1988 | Kleinberg et al. |

FOREIGN PATENT DOCUMENTS 0163574 of 0000 European Pat. Off.

OTHER PUBLICATIONS

"The Oil-Based Mud Dipmeter Tool", by A. Dumont, M. Kubacsi, J-L Chardac SPWLA Twenty-Eighth Annual Logging Symposium, Jun. 29-Jul. 2, 1987.

Primary Examiner—Walter E. Snow
Attorney, Agent, or Firm—William J. Beard

[57] ABSTRACT

A dipmeter has a coil forming a medium frequency field (e.g., five megahertz); the field interacts with the formation to form induced currents in the formations dependent on resistivity. The formation boundaries create a phase shift contrasting with the shift occurring in the formation so that a pair of closely spaced coils on a shoe locates relative transition of a formation boundary. The boundary is located by the several dipmeter arms.

12 Claims, 4 Drawing Sheets

METHODS FOR DETERMINING FORMATION DIP AND STRIKE USING HIGH FREQUENCY PHASE SHIFT

BACKGROUND OF THE DISCLOSURE

A dipmeter is logging device which determines the dip of a formation intercepted by the borehole. Customarily, they use extendable arms which carry resistivity measuring pads on the arms for contact against the sidewall of the well borehole. The dipmeter is pulled up the borehole, measuring changes in formation resistivity (or its inverse conductivity) as it travels along the well borehole. The dip angle of the formation boundary or interface (a change in resistivity) is indicated by the incremental shift between the respective pads which note passage of the change in resistivity. It is well known to detect the boundary of a strata or formation, thereby determining the dip angle with respect to the borehole and an imaginary horizontal plane. Heretofore, current conductive electrode type dipmeters typically inject current into the formation in a low frequency range, typically about one to five kilohertz. Sharp angular dip resolution requires that the electrode buttons on the electrode pads be quite small. Excessive size degrades the sharpness of the measurement. In other words, vertical spatial resolution is poor if the buttons are large. Ordinarily, the dipmeter generates a relatively large current which is transmitted from some upper part of the sonde enclosing the dipmeter and which is returned to a lower part of the sonde. The current flow through the formation is dependent on resistivity. The formation current flow is intercepted by the small buttons on the pads. Ordinarily, all the pads extending from the dipmeter will measure the change in resistivity occurring at a boundary when the pads move or slide over the boundary intercept in the borehole.

The foregoing system works quite well so long as formation resistivity can be measured in isolation. Isolation, however, is not always possible. More wells are now being drilled with oil based muds. At the low kilohertz frequency range mentioned above, such muds are essentially nonconductive materials. Drilling muds form a mud cake on the sidewall of the borehole. If the mud cake is nonconductive, there is difficulty in making conductive contact by the small buttons mounted on the electrode pads of the dipmeter. Scrapers and other types of blades mounted adjacent to the electrodes have been used to cut the insulative mud cake so that better electrical contact can be obtained. That is noisy at best. At worst, it creates erratic signals which may be a result of noise so that the noise looks like boundary resistivity changes. This makes log interpretation much more difficult.

Such low frequency dependent dipmeters are additionally limited in highly conductive borehole fluids, particularly those which become commingled with brine. The brine is highly conductive. The current emitted by the electrodes on the dipmeter is transmitted in an altogether different fashion and the detected signals thus become much less reliable. To the extent that any measure of signal reliability is obtained by dragging contact between the buttons on the electrode pads and the adjacent formation, such signal improvement is overwhelmed by the increase in noise derived from dragging the button across the irregular surface of the rock formations. In U.S. Pat. Nos. 4,739,272 and 4,780,678 and also in a publication at the 28th Annual SPWLA Logging Symposium (1987) there is discussed an inductive dipmeter apparatus, which operates similar to miniaturized versions of conventional induction tools, and which contains both transmitter and receiver coil arrays in each pad. This method, while successful to a degree, suffers from the problem of requiring extraordinary accuracy in assembly of the coils to maintain mutual coupling balance, while the spatial resolution (in the range of one to two inches) is generally regarded as barely adequate for accurate dipmeter interpretation.

The present disclosure sets out a dipmeter which overcomes all these problems by providing an entirely different approach to dipmeter measurements. The present approach uses a high frequency induction measurement approach. Instead of having a point contact electrode, and relying on point contact with the formation to detect the boundary between adjacent strata, this approach utilizes small coils to detect signals from the formation. Moreover, a higher frequency is used, preferably in the range of about one to ten megahertz. The sonde is much simpler to construct because it does not have to be constructed to form an injected current which requires division of the sonde into electrically isolated components. In this particular instance, a transmitter coil forms a relatively high frequency field which is directed into the formation. The electrode mounting mechanism of this disclosure is thus the same as that used heretofore, i.e., multiple pads on mechanically linked arms are used. However, the mode of connection of the pads with the formation and particularly the mode in which the signal is obtained is markedly improved. Accordingly, an entirely different approach for obtaining dipmeter measurements is set forth. Even so, the mechanics of the dip meter tool remain substantially the same, and dipmeter log interpretation remain substantially the same.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
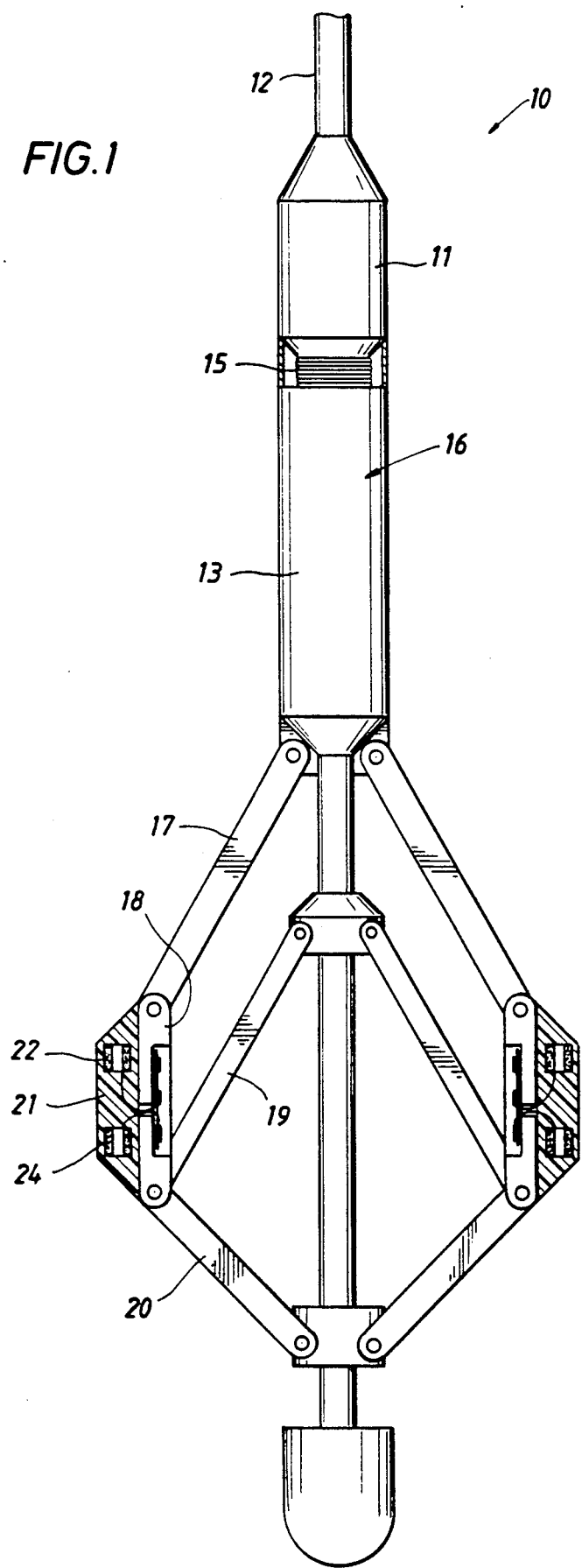
FIG. 1 shows a dipmeter in accordance with the teachings of the present disclosure utilizing a transmitter coil in the upper part of the device to form an induced field in the formation and includes multiple pads which are mounted to extend radially outwardly for sliding contact against the well borehole wherein phase detector measuring circuits are incorporated in the pads.

Attention is directed to FIG. 1 of the drawings where the dipmeter 10 of the present disclosure is set forth. It incorporates an elongate housing or package known as a sonde 10. The sonde incorporates an inclinometer 11 which is at the upper end of the tool. The upper portion of the sonde 12 is constructed for connection with a logging cable (not shown) so that the tool can be raised in a well borehole to conduct logging activities. The sonde is encapsulated within a housing 13 which is of rugged construction to resist ambient pressures and temperatures encountered during operation. A portion of the sonde has a reduced neck diameter so that it can support a transmitter coil 15. The transmitter coil is conveniently wrapped as multiple turns around the smaller neck portion. This coil is driven by an oscillator and forms a field to be described. The transmitter coil 15 creates a field in the formation fully around the borehole and the field causes currents to flow dependent on the formation resistance.

There are measurement circuits 16 included within the housing. The measurement circuits 16 cooperate with telemetry circuits to deliver the output signals through the logging cable for transmission to the surface. The lower portions of the dipmeter 10 include multiple arms. Two have been shown in FIG. 1, but it will be appreciated that it is normal to use at least three, often four and sometimes six. Since they are all similar and differ only in their position on the dipmeter 10, it is thought that description of one will suffice for all the others. To this end, an arm 17 connects with a mounting plate 18. The plate 18 is held parallel to the sidewall. Another arm 19 assists in holding the plate parallel to the sidewall. Another link 20 is included and it connects with a slidable collar near the base of the dipmeter. By appropriate and well known mounting mechanisms, the pad to be described is urged into contact with the adjacent wall of the borehole to make measurements.

The apparatus includes a pad 21. It is formed of a sacrificial ceramic material. It encounters rough wear and is ultimately worn away and must be replaced when worn. It is provided with a slightly curving face so that it can slide smoothly against the wall, keeping in mind that it is being abraded by the rough rock wall which confronts it. The ceramic pad 21 has embedded therein two coils. The upper coil 22 is identical to the lower coil 24, the two coils differing only in vertical spacing. The coils are wound about an axis which is parallel to the axis of the dipmeter 10. They are relatively small coils. They detect small current flows in the formation and hence create relatively small output signals. To this end, they can be wound of quite fine wire with many turns to form an output signal. This enables the coils to be quite small in physical dimensions. The coils can be round and hence are wound on a cylindrical coil form if desired. Alternately, the pad can have substantial angular contact with the well borehole and, in that sense, is a portion of an arc. If that is the case, the coils 22 and 24 can have substantial width, and can even be formed of conductors plated onto a two-sided printed circuit board which is curved to conform to the cylindrical borehole in which the device is used. In any event, the two coils are spaced vertically from one another by a specified distance. It is ideal that they be relatively close, typically with vertical spacing of about 0.5 inches or as small as 0.2 inches. The two coils have signals induced therein and form their output signals which are delivered to a differential system related in FIG. 2 that will be described in detail later.

Figure 2:
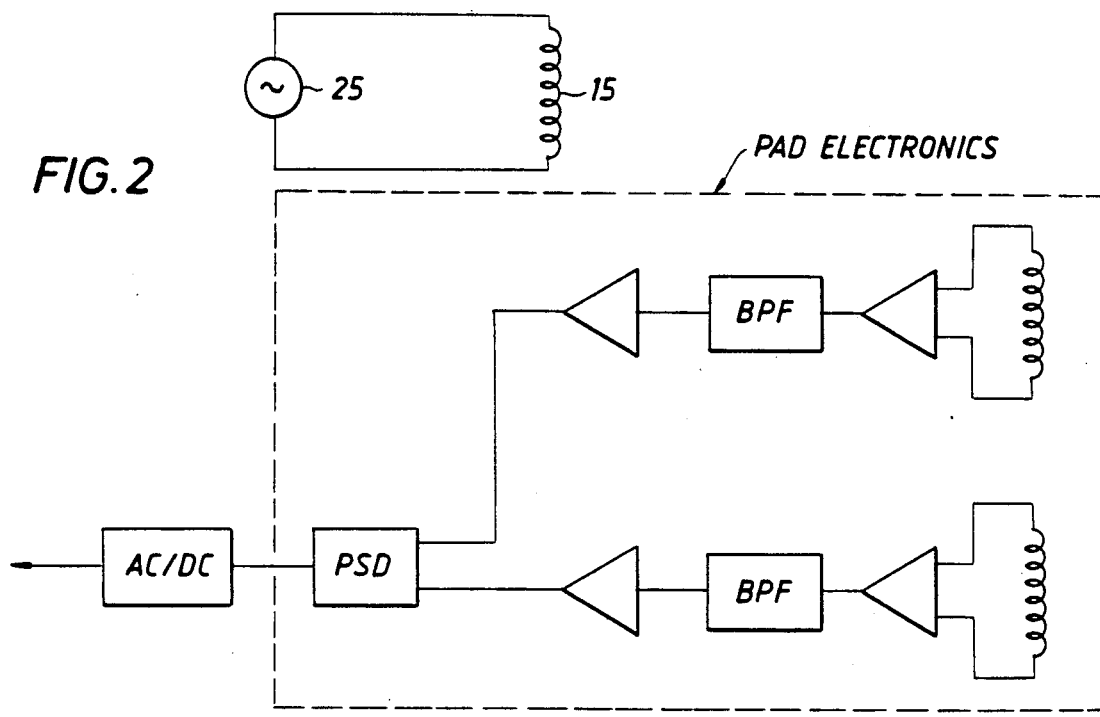
FIG. 2 is a block diagram schematic showing the cooperation of adjacent detector coils which provide a measurement of phase shift.
Figure 3:
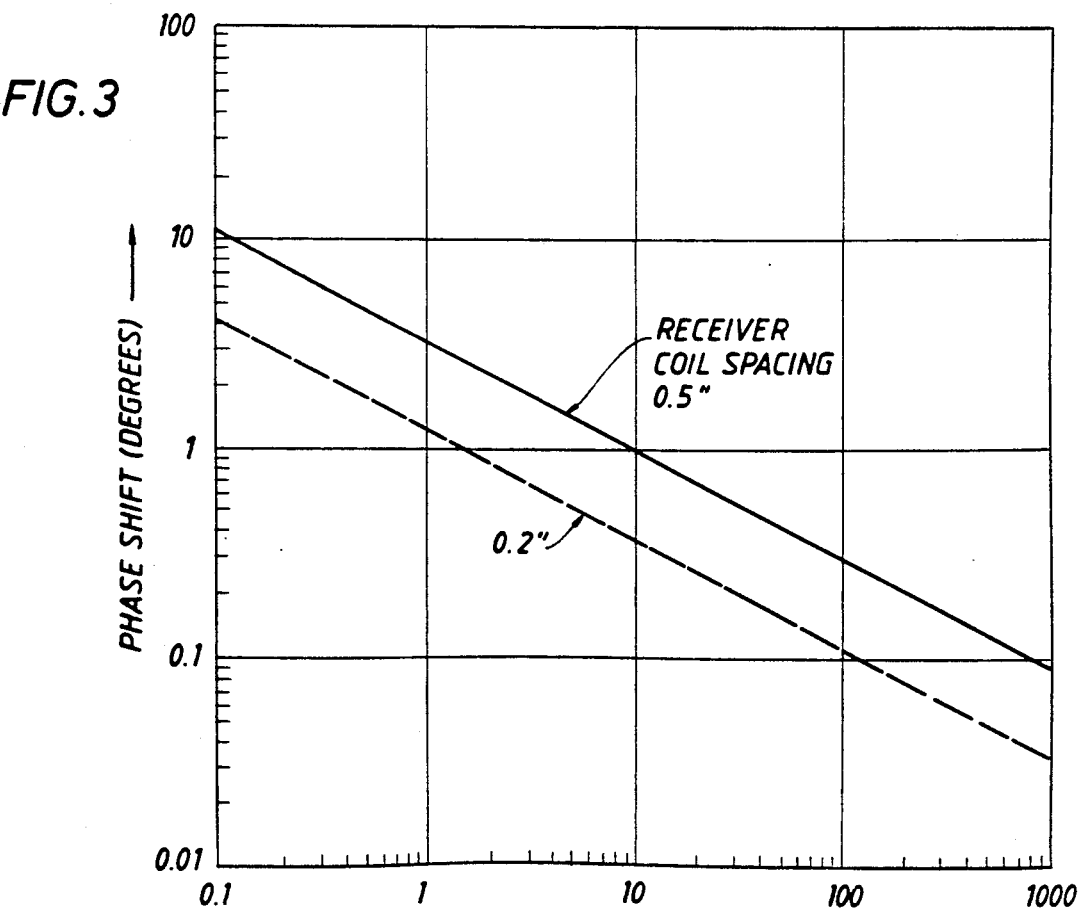
FIG. 3 shows dipmeter phase shift versus resistivity for different spacings of the detector coils.

Note should be taken of the inductive coupling between the transmitter coil 15 and the formations adjacent to the borehole. Typically, the transmitter coil 15 is about thirty to seventy inches above the measurement pads. The transmitter coil is provided with a continuous wave (CW) signal which provides a current of perhaps one ampere or more. The preferred operating frequency is in the range of about one to ten megahertz and about five megahertz is preferred. For various reasons, the frequency range can be extended. The coil 15 forms a longitudinal magnetic field with an azimuthal electric field. The field induces current flow in the formations adjacent to the well borehole. More generally, as outlined in the U.S. Pat. No. 3,551,797 (now expired), it can be assumed that plane-parallel waves at the frequencies contemplated pass in the vicinity of the receiver coils at a velocity dependant on local resistivity. Attention is directed to FIG. 3 of the drawings which shows phase shift to be a function of formation resistivity. In FIG. 3, where spacing is seventy inches from the transmitter coil 15 to the pads, the phase shift is shown over about four orders of magnitude of resistivity. The present apparatus need not detect absolute phase shift but it does measure differential phase shift as will be explained. In FIG. 2 of the drawings, the transmitter coil 15 is shown connected with a CW transmitter 25. The transmitter forms a field inducing current flow in the formations and in turn, signals are detected in the pad coils 22 and 24. As shown there, 22 is connected with an amplifier 26, and the coil 24 is connected with an amplifier 27. In turn, they form outputs for duplicate band pass filters 28 and 29. These outputs are provided through additional comparators configured as zero crossing detectors 30 and 31. These two signals are then provided to a phase shift detector 32. The output of the PSD 32 is then delivered to an analog to digital converter 33. The phase shift differential (measured either in degrees or in time differential) is then output to the surface. As will be understood, the phase shift is represented by a digital word formed by the ADC 33.

Through the use of this differential circuit, absolute values are meaningless. Accordingly, the currents formed in the formation may vary for a multitude of reasons, but current amplitude is no longer important. What is significant is the phase shift between the two coils 22 and 24. There will be an interaction of the formation with the field imposed on the formation by the coil 15. Particularly at a change in resistivity, there will be a change in phase shift as suggested by FIG. 3. The change of phase shift depends in part on the resistivity difference across the boundary. It also depends in part on the spacing of the two coils 22 and 24. FIG. 3 is a representative showing of phase shift with two different curves, one from receiver coil spacing of 0.5 inches, and the other showing spacing of 0.2 inches. The curves of FIG. 3 are at a representative frequency of five megahertz. If the frequency is different, the values might change somewhat, but the same differential relationship will generally hold true. That is, closer coil spacing shows a reduced phase shift differential between the two coils.

Figure 4:
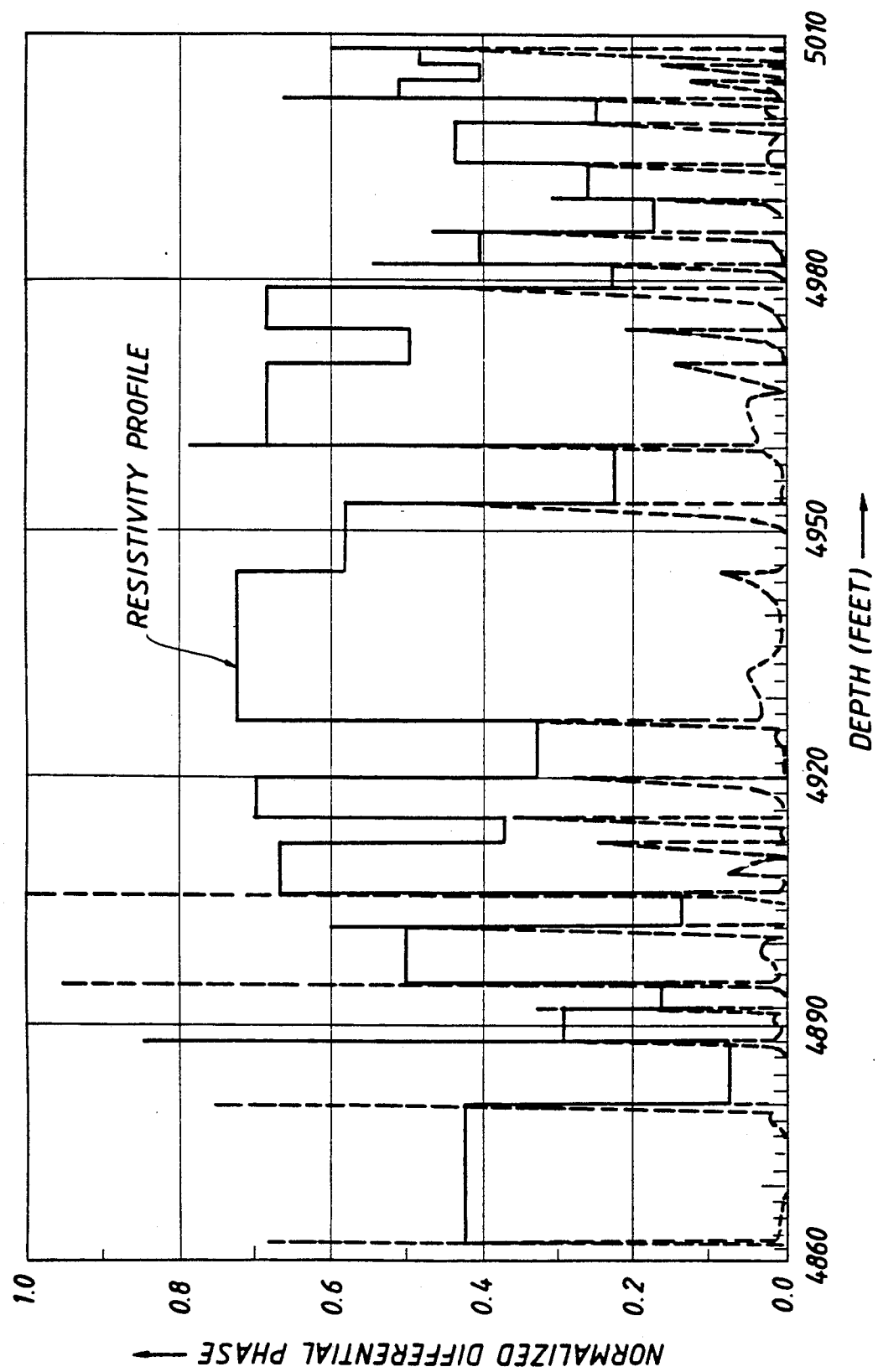
FIG. 4 shows a normalized phase shift differential which has been superimposed over a resistivity profile.

Attention is now directed to FIG. 4 of the drawings which shows a normalized differential phase over a logged interval. The differential phase shift is defined as the change in the phase measured by the aforementioned apparatus between successive measurements at an incremental change in depth, divided by average phase shift as follows:

$$\phi(z) = \frac{|\phi_z - \phi_{z-1}|}{\sqrt{\phi_z \times \phi_{z-1}}}$$

Figure 5:
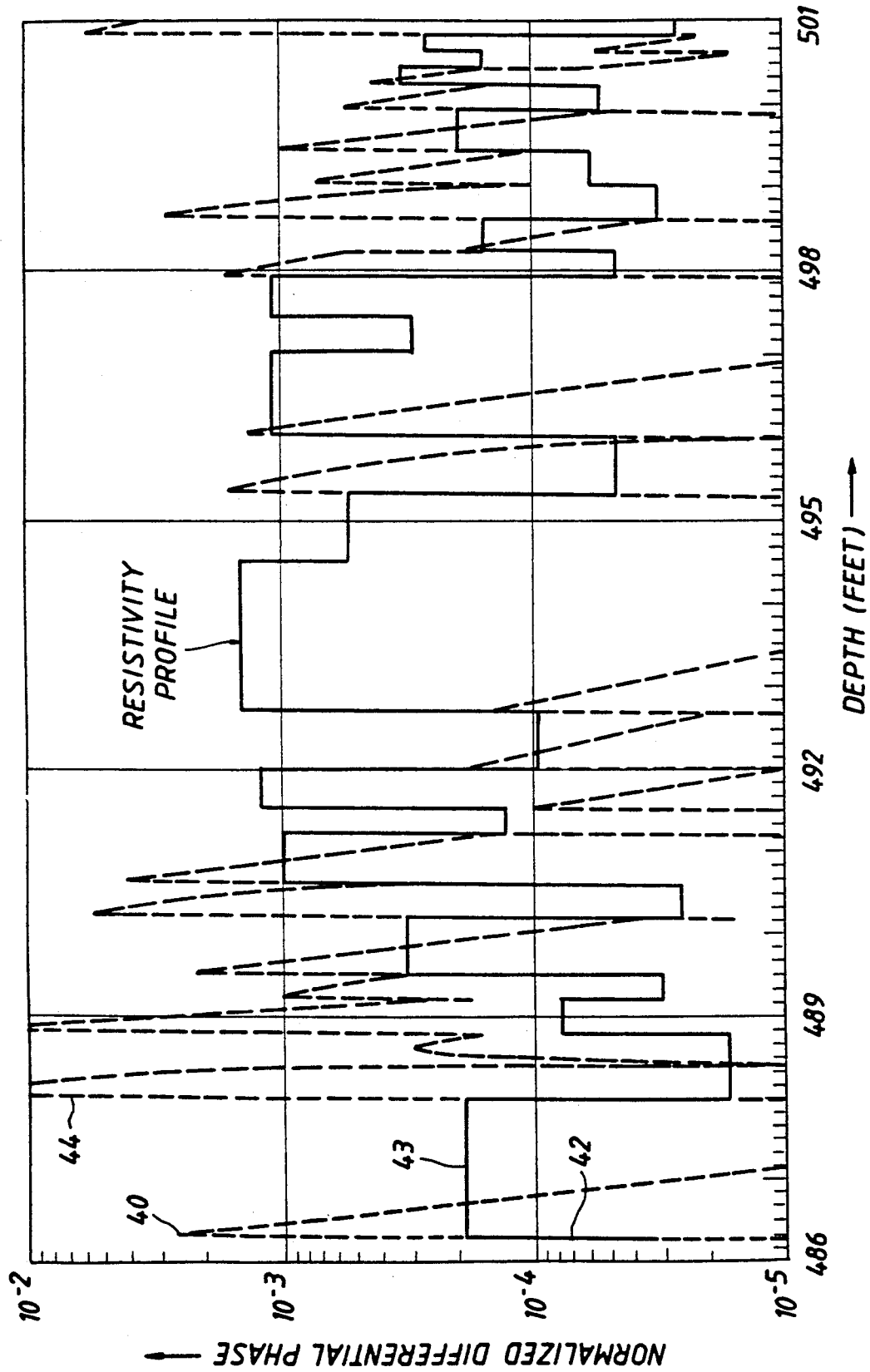
FIG. 5 shows a normalized phase shift differential which has been superimposed over a resistivity profile for a more closely-spaced set of beds.

Normalized differential phase shift, where $\phi_z$ is the phase measured at depth z and $\phi_{z-1}$ is the phase measured at depth z−1, i.e. previous depth sample. The depth samples may be as fine as 0.2 to 0.5 inches. This differential method of signal processing is a feature of the present invention and is possible because of the elimination of sliding contact noise typical of more traditional designs. As will be understood, when both coils are adjacent a common strata and the boundaries of that strata are quite remote from the two coils, the differential phase shift substantially decreases to some very small value. However, the differential changes substantially when the boundary between two strata relatively passes the two coils. On this event, a very different phase shift signal is created; that is, a disturbance in the differential phase is output. When such a boundary is encountered, the boundary causes a change in differential phase shift that can readily be two or three orders of magnitude greater. While it is a small differential prior to the boundary passage, such a change is quite noteworthy and provides an indication of the boundary passing the pair of coils. For instance in FIG. 5 with an expanded depth scale, at the depth of 486 feet, there is a large change in measured differential phase shift indicated by the dotted line 40. That in turn indicates a strata boundary at 42 where the line 43 indicates the relative thickness of the particular strata. The line 43 extends from the differential phase peak measurement 40 to the next peak measurement 44. The line 43 thus represents the thickness of that particular strata between the boundaries represented at 40 and 44. It is apparent that a strong response is obtained at boundaries separated by only a few inches, as in thinly laminated rock formations.

The coils 22 and 24 sample the magnetic field which is parallel to the well borehole at the face of the borehole. The currents in the formation induce voltages in the coils showing the phase shift dependency exemplified in FIG. 3 of the drawings. Moreover, phase shift provides a relatively accurate measurement of formation resistivity in the immediate vicinity of the pad. Referring again to FIG. 3, it again shows that phase shift is directly related to formation resistivity. Absolute measurement of formation resistance is not essential to a dipmeter; it is, however, helpful to obtain some correlation between the dipmeter log and tools which make resistivity measurements. This enables the dipmeter data of the present disclosure to be correlated to data from other types of instruments. Even though the present apparatus is not intended for resistivity measurements, such data can be obtained and correlated with boundary identification.

In the presence of oil based drilling fluids which are nonconductive or salt water which is highly conductive, the disclosed apparatus still functions in the same way. Contact noise is no problem because there is no attempt made to obtain mechanical contact between the coils and the surrounding sidewall of the borehole. Moreover, the fluids in the borehole have less impact in this circumstance than they do in contact measurements because the coils 22 and 24 respond to induced currents in the formation. That is, currents are created in the formation resulting from the field focusing into the formation so that borehole fluid has reduced significance. Since the field is substantially in the formation, the signals in the detector coils 22 and 24 are less impacted by borehole fluid. Moreover, the choice of frequency fairly well limits the depth of penetration of the field induced currents into the formation. It is possible, of course, to select frequencies where the currents flow many feet beyond the borehole. That is not intended in this instance. Rather, it is intended that the current flow be induced in the formation close to and parallel to the borehole, and relatively close without extending deep into the formation. In that sense, the present device does not operate like resistivity tools which use current emitting and focusing electrodes to direct the current flow deep into the formation. Accordingly, the induced field in the formation is shaped so that measurements are obtained from formation boundaries, and are less impacted by the fluids in the borehole, and also smaller inaccuracy is introduced by the angle of dip of the bed boundaries, which causes problems with deeper penetrating measurement techniques.

In similar fashion to traditional dipmeters, the advent of formation boundaries at each pad is duly noted, and the multiple traces from the several pads are analyzed in the known manner. The output signals are correlated to determine the dip of the boundary creating the change in differential phase shift.

While the foregoing is directed to the preferred embodiment, the scope is determined by the claims which follow.

What is claimed is:

1. A method of determining bed boundary dip in a well borehole, comprising the steps of:
   (a) forming a moving AC field in the earth formations adjacent to a well borehole by causing an AC current flow in the megahertz frequency range through a transmitter coil wherein the field induces currents to flow in the formations adjacent to the well borehole wherein the phase shift of the induced currents are dependent on formation resistivity;
   (b) measuring phase shift at multiple azimuthal locations along the sidewall of the well borehole by moving along the sidewall of the well borehole at least three pair of longitudinally separated offset coil means each of which have field induced signals formed therein wherein the induced signals are compared to form at least three azimuthally separated phase shift signals;
   (c) signal processing said at least three phase shift signals by applying a normalized differential phase shift algorithm wherein a dimensionless quantity is computed for successive depth samples of phase shift at each of said at least three offset coil pairs for comparison and accurate correlation to determine dip and strike angles of bed boundaries versus depth; and
   (d) as a function of differential phase shift, determining movement of a bed boundary relative to each of said at least three pairs of said coil means.

2. The method of claim 1 including the step of observing differential phase shift increase to identify a boundary.

3. The method of claim 1 wherein the coil is centered in the well borehole on the axis thereof to form a field around the well borehole wherein the field is continuously formed along a portion of the well borehole, and positioning said offset coil means parallel to the well borehole axis to detect phase shift along the length of the well borehole so that relative movement of a formation boundary through the field forms a change in the phase shift.

4. The method of claim 3 including the step of offsetting said coil means by a distance along the axis of the well borehole.

5. The method of claim 4 wherein the offset distance is less than 0.5 inches.

6. The method of claim 1 wherein the phase shift is independent of the signal amplitude.

7. The method of claim 1 wherein the phase shift is measured at the frequency of the AC field.

8. The method of claim 1 wherein the offset coil means forms two separate signals, and including the steps of amplifying the two signals, and thereafter comparing the phase of the two signals to obtain a phase shift output signal.

9. The method of claim 8 including the step of mounting said offset coil means on an arm extending toward the sidewall of the well borehole, and further measuring additional differential phase shift signal at multiple locations around the well borehole.

10. The method of claim 1 wherein the offset coil means forms two separate signals and thereafter demodulating the phase of the two signals to obtain a phase shift output signal.

11. The method of claim 9 including the step of positioning said offset coil means in a sacrificial wear member for contact with the sidewall of the well borehole.

12. The method of claim 1 in which the algorithm includes taking the modulus of the difference between phase shift measured at two successive depths and dividing the result by the geometric mean of the two phase shifts, producing a dimensionless quantity indicative only of the spatial discontinuity of a bed boundary.

* * * * *